United States Patent [19]

D'Addario et al.

[11] Patent Number: 5,551,987
[45] Date of Patent: Sep. 3, 1996

[54] PROCESS FOR THE BIOLOGICAL TREATMENT OF SOLID WASTE AND MUD CONTAMINATED BY HYDROCARBONS

[75] Inventors: Ezio D'Addario, Monterotondo; Eugenio Fascetti, Rome; Alberto Patricelli, Monterotondo; Giulio Prosperi; Andrea Robertiello, both of Rome, all of Italy

[73] Assignee: Ministero Dell 'Universita' E Della Ricerca Scientifica E Tecnologica, Rome, Italy

[21] Appl. No.: 327,240

[22] Filed: Oct. 21, 1994

[30] Foreign Application Priority Data

Nov. 4, 1993 [IT] Italy .................. MI93A2335

[51] Int. Cl.$^6$ ............... B01D 11/02; B08B 3/08; C02F 11/02; C23G 5/02

[52] U.S. Cl. .............. 134/10; 134/25.1; 134/40; 210/631; 210/634; 210/772

[58] Field of Search ............... 134/10, 40, 25.1; 210/631, 634, 772

[56] References Cited

U.S. PATENT DOCUMENTS

| | | | |
|---|---|---|---|
| 4,392,892 | 7/1983 | Wagner et al. | 134/25.1 |
| 4,971,703 | 11/1990 | Sealock, Jr. et al. | 210/708 |
| 5,273,659 | 12/1993 | Antoniou et al. | 210/651 |
| 5,300,227 | 4/1994 | Varadaraj et al. | 134/40 |

Primary Examiner—Zeinab El-Arini
Attorney, Agent, or Firm—Rogers & Wells; George P. Hoare, Jr.

[57] ABSTRACT

Process for the biological treatment of mud and oily residues obtained from the processing or extraction of crude oil. This process can be applied to mud alone, its mixtures and to suitable combinations of mud and oily emulsions.

6 Claims, 2 Drawing Sheets

PROCESS FOR THE BIOLOGICAL TREATMENT OF SOLID WASTE AND MUD CONTAMINATED BY HYDROCARBONS

BACKGROUND OF THE INVENTION

1. Field of the Invention

The present invention relates to a process for the biological treatment of mud and oily residues generated by the oil and petrolchemical industry.

2. Description of the Prior Art

Materials of this kind arise from the storage of crude oil, intermediates and end-produces of an oil origin, from refinery processing and accidental contamination of the ground with hydrocarbons. They are obtained in a great quantity. Recent estimations indicate about 2.5 and 0.8 million tons per year of mud coming from the American and European refining industries respectively. Italian law classifies process mud arising from the storage of oil products as toxic and harmful waste and provides for their placement in third-category type C discharge grounds.

American law (Resource Conservation and Recovery Act) classifies mud generated by refineries as "dangerous" and has adopted a special classification thereof:

tank bottoms for the storage of lead distillates (code EPA K 052);

API separator mud (separating systems for oil-water-solids before water treatment plants, code EPA K 051);

materials obtained from the air flotation of water-oil mixtures (code EPA K 048);

water-oil emulsions (slop oil emulsion, code EPA K 049);

mud obtained from the cleaning of exchangers (code EPA K 050);

primary mud obtained from water storage basins and water-oil separation plants (code EPA F 037);

secondary mud coming from flotation plants and other equipment for the collection of water-oil waste (code EPA F 038).

These materials can be disposed of by thermodestruction, landfilling or landfarming. If the latter disposal methods are used, American law (Hazardous and Solid Waste Amendments Act, HSWA 1984) imposes pre-treatment to reach the BDAT standards (Best Demonstrated Available Technology). These standards were promulgated by EPA at the end of the 80s' for K type mud and in 1992 for F type mud. For the latter waste however the adoption of the BDTA limits was postponed until 1994. The limitations involved relate to the main aromatic polycyclic hydrocarbons (anthracene, benzoanthracene, benzopyrene, chrysene, naphthalene, phenanthrene and pyrene), the main heavy metals (chromium and nichel) and organic molecules with a high toxicity (benzene, ethyl and butylphthalate, ethylbenzene, phenol, toluene, xylene, cresols and cyanides).

The impact of the adoption of these new standards on the American refining industry has been considerable. It has in fact been estimated that the costs of treating this waste, indicated at about 40 million dollars in 1992, will rise to 240 million dollars in 1994.

In Europe, the standards which regulate the disposal of waste material contaminated by hydrocarbons are not the same in the various countries. In any case however, for the disposal of waste generated by oil refinery alone, over 38 million dollars are spent each year.

The oil industry is making very severe regulations for environmental protection with the following main approaches:

prevention of pollution by minimizing the volume of mud produced;

recycling of mud to the productive units (cokization plants and catalytic cracking);

thermal treatment, outside the battery limits of the refineries, in centralized incinerators or ovens for cement (off-site treatment);

purification within the battery limits of oil plants (on-site treatment) by extraction techniques with solvent, thermal desorption, biological treatment.

Among on-site processes, original physico-chemical approaches can be noted. U.S. Pat. No. 4,971,703 (Battelle Memorial Institute), proposes for example, a breaking process of typical oily emulsions such as mud from API separators and air flotation systems. This is based on heating to a high temperature (equal to or higher than 300° C.) and high pressure (higher than water vapor pressure). The treatment is prolonged for such times as to allow the separation of an oily flow which can be recycled in the refinery, a water flow which is sent to the water treatment plants and a small flow with a high content of solids miscible with the waste water flow. Patent EP 372 761 A2 (The Standard Oil Company) and those related to it, propose instead extraction technologies with a solvent of undesired products from refinery mud as such, refinery mud subjected to dewatering and extraction mud of the crude product.

Among on-site treatment techniques, biological ones are generally preferred. They are in fact characterized by minimum environmental discharges with consequent fewer management problems. For example, in the United States the management of biological plants is regulated by federal laws defined by the Clean Water Act. They are consequently exempt from management permits whose issue on the part of the proposed organizations (Resource Conservation and Recovery Act) often influences the economic feasibility of on-site treatment processes. For biological-type processes applications on the following scales are reported: a) laboratory (60 l reactors), b) demonstrative (mobile unit tested at the beginning of 1992 in the Gulf Coast Refinery) and c) industrial (carried out at Amoco's former Sugar Creek refinery, Montana, and the French Limited Superfund, Tex.).

These processes are based on the following scheme. The oily mud (see FIG. 1), under suitable process conditions, is fed to a pre-treatment phase carried out to recover most of the oily phase present and reduce the organic matter being fed to the biological section. The pre-treatment is normally carried out with three-phase decanter centrifuges, or with filtrating systems whose functioning can be facilitated by recycling the treated mud. The bio-oxidation treatment is carried out directly on the solid material obtained from the pre-treatment phase. Under these conditions it is prolonged for considerably long residence times (about 30 days).

The stabilization is carried out when it is necessary to avoid the discharge of heavy metals possibly present, whereas the final dewatering has the purpose of reducing the volume of material treated.

DETAILED DESCRIPTION OF THE INVENTION

We have now found a process which improves the solutions proposed so far for the biological treatment of mud and oily residues obtained from the processing or extraction of crude oil. This process can be applied to mud alone, its mixtures and suitable combinations of mud and oily emulsions.

In accordance with this the present invention relates to a process for the treatment of solid waste and mud contaminated by oily residues according to the following steps:

(a) pre-treatment at 40°–110° C. by means of at least one extraction with a non-volatile organic solvent in a ratio of 0.1–3:1 with hydrocarbons to separate the oily phase from the solid residue;

(b) washing the solid residue resulting from step (a) with supernatant liquid coming from step (c) in a ratio of 5–15:1 with said solid residue;

(c) bioxidation of the washing medium with a hydrocarbon-oxidant microbic mixture and high producer of biosurfactant.

Figure 1:
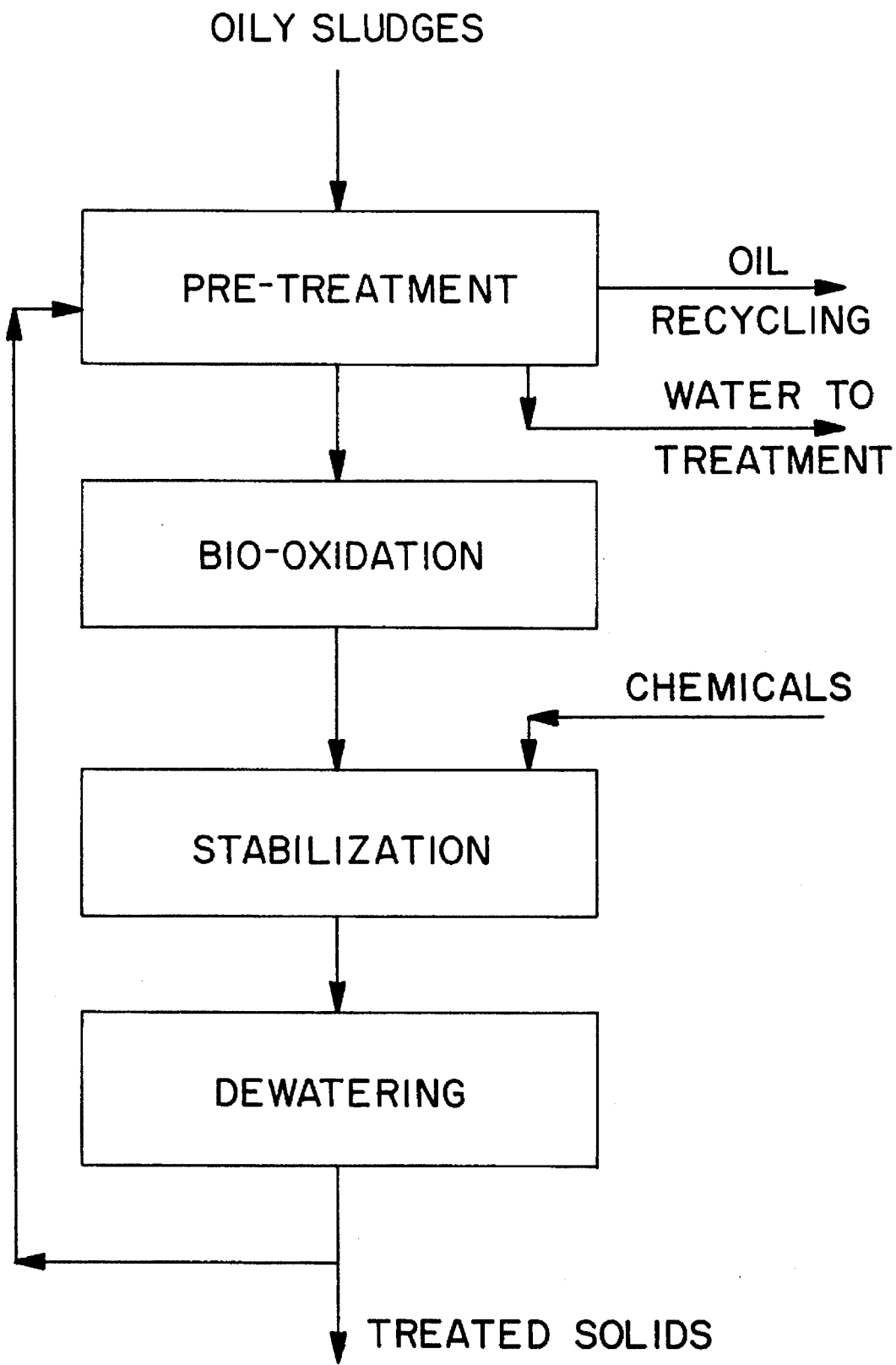
FIG. 1 shows a scheme on which prior treatment processes are based.
Figure 2:
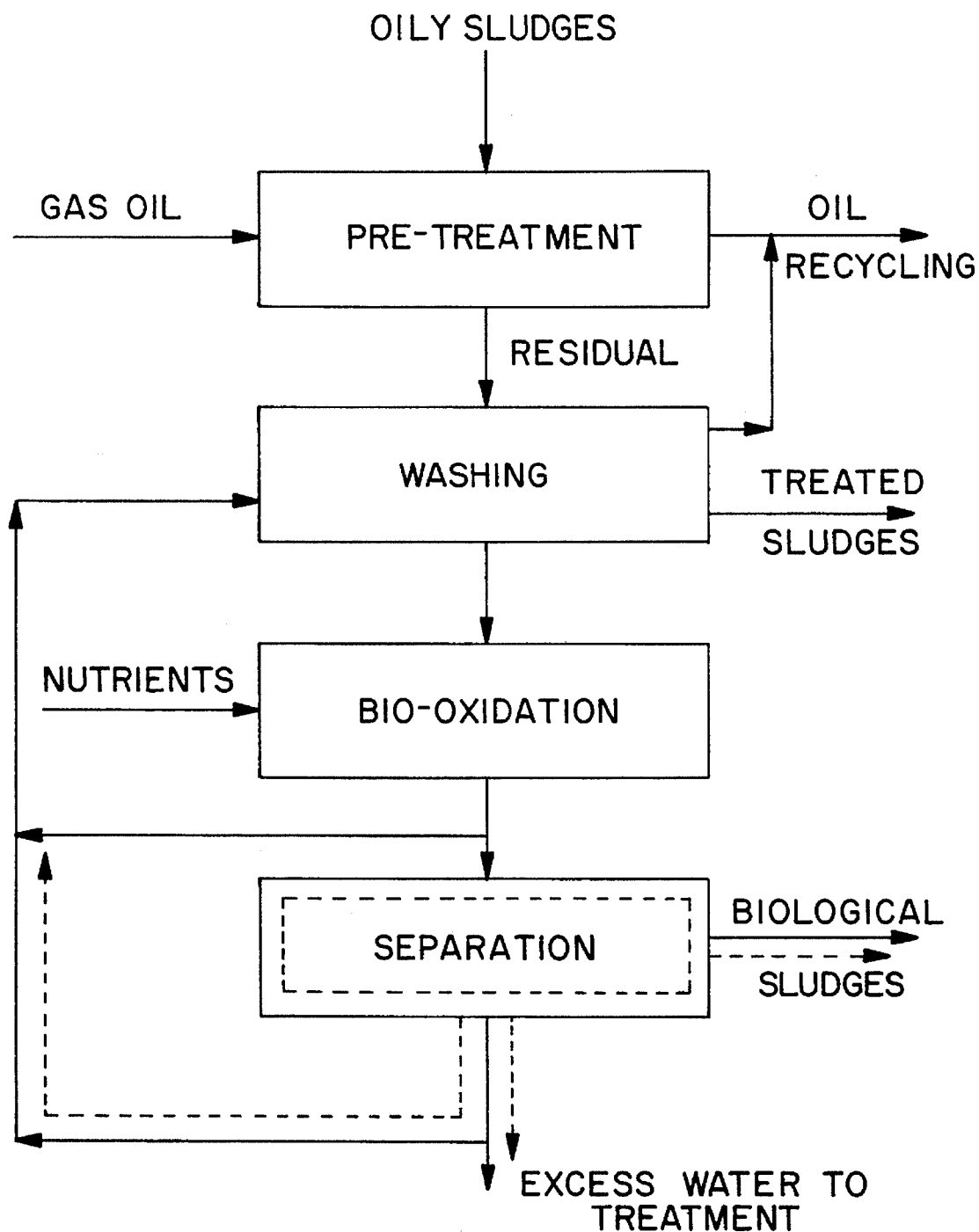
FIG. 2 shows the scheme on which the instant treatment process is based.

The process is now illustrated with reference to the block scheme of FIG. 2.

The pre-treatment of the oily mud, always carried out with the aim of recycling most of the oily phase and reducing the amount being fed to the biological section, is carried out by extraction with a non-volatile organic solvent, preferably gasoline, in one or more steps, in countercurrent or crossed currents. The solvent is used in a ratio of 0.1–3:1 (under preferred conditions in a ratio of 1:1) with respect to the hydrocarbons present in the mud. Each step of the pre-treatment section is carried out with equipment for mixing the mud and solvent and equipment for separating the phases.

The mixing can be carried out in suitable stirred containers, whereas the separation can be carried out in centrifuges and/or settlers and/or static or vibrated grids and/or filters. During the pre-treatment the temperature of the materials is brought to such values (40°–90° C.) as to reduce the consistency of the mud, enable its good fluidity, and obtain a forced pastorization of the material to be sent for subsequent biological treatment. This normally occurs at 90° C. The solid residue obtained after the pre-treatment is subjected to a washing process with culture broth as such obtained from the subsequent bio-oxidation treatment, or with the supernatant liquid resulting from the separation operation of the biomass contained in the culture broth.

The removal of the oily phase contained in the residue resulting from the pre-treatment is favoured by the presence of the supernatant liquids produced by the suitably selected microbic strains in the bio-oxidation reactor.

The washing is also carried out with a process of various phases (normally three). For this purpose equipment similar to that used for the pre-treatment can be used. The process parameters of the washing section depend on the type of material to be treated. The washing liquid is however used in great excess (for example 5–15:1 for residues obtained from typical tank deposits) and, when necessary, the temperature conditions are raised (30°–90° C.) as well as the pH (7–12) to allow the removal of the oily phase to within the limits of the law. Under preferred conditions the ratio aqueous phase solids is equal to 15:1, the temperature is about 35° C. and the pH 7.5.

The bio-oxidation of the oily phase present in the washing water medium, takes place in normal CSTR-type (Continuous Stirred Tank Reactor) fermenters. In accordance with the present invention it is possible to obtain the almost complete degradation of the hydrocarbons fed with residence times of less than a day, inoculating the fermenter with a suitable microbic mix of hydrocarbon-oxidant strains and high producers of biosurfactants.

When required the separation of the biological mud obtained from the degradation of the hydrocarbons can be carried out with normal separating devices such as centrifuges and filters. It should be noted, however, that for many types of mud this operation can be avoided and the washing of the residue can be carried out with greater advantage operating with culture broth as such.

The process of the present invention has the following main advantages:

maximum recycling of the hydrocarbons, of which a further recovery can be obtained by demixing from the aqueous stream being fed to the bio-reactor;

facilitation of the microbic attack owing to greater availability of hydrocarbons present in a dissolved or dispersed form in the stream at the inlet to the biological system;

maximum surface-active capacities of the fermentation broth which are also exploited outside the bio-oxidation system (extraction phase of the pre-treated residue);

use of biological reactors without the solid phase internally, consequently similar to traditional-type fermenters;

facility of adoption of biological processes of the continuous type operating at maximum microbic concentration, with a self-improving capacity (maximum concentration of the less available carbon forms) and self-equilibrium (attenuation in the effects due to changes in the feeding characteristics);

control of the development of the pathogenous microbic strains.

From a practical point of view, all this leads to a great facilitation of the biological process, which can be seen through a drastic decrease in the residence times (from about 30 days in other biological-type processes to 0.5–1 day), and an easier and more reliable handling of the process.

The following examples provide a better understanding of the invention but do not limit it in any way.

EXAMPLE 1

The initial inoculum was obtained from microbic populations, classified as non-pathogenous for man or animals contained in the oily mud, in mud resulting from water treatment plants of refineries and soil chronically polluted by hydrocarbons.

Adequate selection procedures of the most suitable microbic combination and improvement of its degradative activity were carried out using, in continous culture, two cascade fermenters with a useful volume of 0.5 and one litre respectively. They were equipped with turbine mechanical stirrers, spargers for the inlet of air and an automatic pH control system. The fermenters were charged with a minimum sterilized saline medium having the following composition (g/l): $MgSo_4$ 7 $H_2O$ 0.6; $CaCl_2$ 0.04; $KH_2PO_4$ 4; $NH_4Cl$ 2; $FeCl_3$ 0.075; (pH 7.0 for NaOH). 2.5 g of a tank bottom from the storage of crude oil having the characteristics indicated in table 1, were added to the first fermenter. This material was initially stuck onto 2.5 g of Celite to increase the surface exposed and to favour the microbic attack. More specifically, the bottom was dissolved in 50 ml of petroleum ether, the Celite was added and the whole mixture was dried at room temperature in an air stream. The prepared fermenter was inoculated with a mixture of twelve bacterial strains (Table 2) previously isolated from the above materials.

The strains were selected on the basis of their capacity to produce biosurfactants and to oxidize groups of hydrocarbons normally considered as having a limited biodegradability (polycyclic aromatics, cycloalkanes, branched alkanes, isopropyl benzene etc.).

After a period of about 2 days of growth in batch, the feeding was carried out in continuous of the first fermenter with fresh saline earth at a flow of 15 ml/hour.

TABLE 2

List of strains used for the inoculum

1. *Pseudomonas mendocina*
2. *Flavobacterium multivorum*
3. *Xantomonas maltophila*
4. *Acinetobacter calcoaceticus*
5. *Pseudomonas paucimobilis*
6. *Rohdococcus* sp.
7. *Pseudomonas putida*
8. *Pseudomonas butanovora*
9. *Pseudomonas stutzeri*
10. *Alcligenes faecalis*
11. *Arthrobacter* sp.
12. *Alcaligenes xylosoxidans*.

The stream leaving the first fermenter was fed to the second, from which a flow of 15 ml/h was recycled to the first. In fact the total feeding system was then fed at a total rate of 30 ml/hour. This led to a hydraulic retention time of about 0.7 days in the first reactor and 1.4 days in the second. The system was treated for about two months. During this period the carbon source was fed in batch to the first fermenter, in quantities and times depending on the development of microbic growth (on an average 2.5 g of tank bottom per day).

After about two months of treatment, the following microbic species had taken the majority in the system (% of the total population): *Xantomonas maltophilia* (50), *Acinetobacter calcoaceticus* (25), *Alcaligenes faecalis* (5), *Pseudomonas mendocina* (15), others (5). Quantities of culture broth containing these strains were freeze dried and reserved for subsequent inoculation operations.

Four kilos of oily mud resulting from the storage of crude oil were charged into a steel reactor equipped with a mechanical stirrer and thermostat system. The characteristics of the mud are shown in table 1.

TABLE 1

Characteristics of a tank bottom obtained from the storage of crude oil.

| Composition: | |
| --- | --- |
| Hydrocarbons | 67.3% |
| Inert products (iron oxide, silica, etc.) | 17.8% |
| Water | 14.9% |
| Hydrocarbon groups: | |
| Asphaltenes | 13.6% w/w |
| Saturated hydrocarbons | 58.0% w/w |
| Aromatic hydrocarbons | 24.3% w/w |
| Polar hydrocarbons | 4.1% w/w |
| Ultimate analysis of the hydrocarbons: | |
| Carbon | 82.6% w/w |
| Hydrogen | 12.5% w/w |
| Nitrogen | 0.4% w/w |
| Sulphur | 3.3% w/w |
| Oxygen | 1.2% w/w |

1.34 kg of gas oil with the following characteristics, were added to the material: density 0.84 kg/l; viscosity (50° C.) 3.2 cSt; pour point −4° C.; initial and final boiling points 235° and 350° C. The heating was started and, when the material had the necessary fluidity characteristics, the mechanical stirring was initiated. When the temperature reached 90° C., the stirring was stopped to allow the sedimentation of the solid material. The oily phase was then sucked and removed from the head.

At this stage a second extraction phase of the hydrocarbons still contained in the solid remaining in the container was initiated. This was carried out using the same procedure described above.

The pre-treatment of the mud was completed with a third extraction step of the hydrocarbons wherein the mixing procedure remained unvaried. The separation of the final residue was carried out with the help of a static grid (seives with light of 0.6 mm) placed under the mixing container and fed by gravity.

The oily phases obtained from the first two steps were joined and subjected to a further operation for the removal of the inert material of small dimensions contained therein (static grid with sieves having light of 0.4 mm). From this operation an oily phase was obtained similar to crude oil which could therefore be recycled in the refinery.

To minimize the consumption of gas oil the oily phase obtained from the last step was recycled to the first pre-treatment step of the subsequent batch of mud.

The operations were repeated on four subsequent samples of mud until the equilibrium state was reached. Under these conditions, 4 kg of mud and 2.7 kg of gas oil led to the production of 0.96 kg of residue and 5.74 kg of oily phase recyclable in the refinery. The content of hydrocarbons, inert material and water in this stream was respectively equal to 90.9; 3.9 and 5.2%.

The 0.96 kg of solid residue obtained as described above were placed in a glass reactor equipped with a mechanical stirrer and thermostat system. 5.3 kg of supernatant liquid obtained from the centrifugation of the stream leaving the bioreactor were added to the material. The system was then put under stirring, the pH was raised to 12 by the addition of 4N sodium carbonate and the mixture was heated to 90° C. When this temperature had been reached, the stirring was stopped to allow for the separation of the various phases contained in the system. After about an hour, about 100 g of oily phase could be skimmed from the surface of the container, which were joined to that to be recycled in the refinery. 5.2 kg of water phase containing hydrocarbons in dispersion were then sucked from the container.

The solid material collected on the bottom of the container was subjected to two further washing steps.

These were carried out using the same procedure described above. In this case, however, the pH in the washing phase was reduced to 9 and the separations of the solid from the aqueous phase were carried out by gridding (0.6 mm sieves). It should be noted that the last two washings did not involve the skimming of the oily phase as in the first.

A total of 16 kg of aqueous phase containing hydrocarbons in dispersion to be subjected to subsequent bio-oxidation treatment and 0.87 kg of solid material were obtained from the three washing steps. The content of hydrocarbons, inert material and water in this material was respectively equal to 8.9; 51.1 and 40.0%. It proved to be mechanically removable and on the basis of tests according to Italian law (DPR No. 915/82 and official methods CNR-IRSA for the discharge of metals), could be placed in type-B, second-category burrows. The microbic inoculum, obtained in a freeze-dried form as described above, was revitalized for three days at 30° C. in a stirred flask containing 100 ml of minimum saline sterile medium. 0.2 g of oily phase obtained from the pre-treatment of the above tank bottom were added to this. The bacterial multiplication was continued for a further two days, under the same conditions, and the contents of the flask transferred to a 2 l flask containing 500 ml of sterile saline medium and 1.0 g of oily phase. The revitalized microbic inoculum was then placed in a fermenter equipped with a turbine stirrer having a useful volume of 7 l. The bioreactor was brought up to volume with the sterile saline medium and put under batch conditions. Initially the same carbon source adopted for the revitalization of the inoculum was used. This was used in a proportion of 0.5 g/l. The cultivation in batch was prolonged for four days with the daily addition of 3.5 g of oily phase.

At the end of the growth in batch, 6 l of culture broth were discharged. The cycle was then repeated three times until the water medium necessary for washing the residue had been obtained.

The fermentation broth before the washing was centrifuged in a disk centrifuge operating at 8200 gravities. The aqueous phase containing the hydrocarbons in dispersion obtained after the washing, was fed to the bioreactor at an initial flow of 145 ml/hour. The flow containing the same nutrients used for the revitalization was also fed at this flow rate. They were used however in concentrations four times lower.

At these flow rates the system had a total hydraulic residence time of 24 hours.

The subsequent operation was carried out at increasing flow rates of the liquid phases at the inlet, consequently minimizing the hydraulic residence times of the system. This parameter could be reduced to a minimum of 14 hours.

Under these conditions the liquid phase obtained from the centrifugation of the stream leaving the bioreactor had a COD and $BOD_5$ of 1.38 and 0.25 g/l respectively. It therefore has the necessary characteristics for being able to be disposed of in normal water treatment plants.

The muddy phase obtained from the same operation was characterized by a total content of solids, COD and $BOD_5$ equal to 52.0; 65.2 and 30.1 g/l respectively. With these characteristics the material can therefore be disposed of together with the normal mud obtained from water treatment plants present in refineries.

EXAMPLE 2

The experimental equipment described in example 1 was modified to simplify the removal operations of the inert material. For this purpose all the separating operations carried out both in the pre-treatment phase of the mud and in the washing of the residue, previously carried out with combined processes of decantation and static screening, were substituted with dynamic screening. For this purpose a commercial vibrating screen with continuous discharge of the solids, was used. The apparatus permitted the vibrating movements to be orientated and was equipped with a sieve having grids with light equal to 0.15 mm. The equipment thus modified was operated with oily mud having the characteristics shown in table 3.

TABLE 3

Characteristics of oily mud of different types (values, w/w %)

| SAMPLE No. | 1 | 2 | 3 |
|---|---|---|---|
| COMPONENTS, % w | | | |
| Hydrocarbons | 50.7 | 9.3 | 75.4 |
| Inert material | 29.8 | 80.7 | 15.7 |
| Water | 19.5 | 10.0 | 8.9 |
| INERT MATERIAL | | | |
| Type | Pumice Sawdust | Gravel | Sand Iron oxides |
| Dimensions, mm | 1–3 | 2–15 | 1.5 max |

The three types of material in table 3 were used in a mixture in a proportion of 45, 15 and 40% w/w respectively.

The mixture obtained was treated according to the procedure described in example 1. 20 kg of mud were used, which were pre-treated with a total of 11.1 kg of gas oil. From this operation 4 kg of residue and 27.1 kg of oil recyclable in the refinery, were obtained. From the washing of the residue, with about 60 l of supernatant liquid, 3 kg of mechanically removable solid were obtained, which could be placed in second category, type 2 B burrows. This material had a content of hydrocarbons, inert material and water of 0.74; 87.3 and 11.9% w/w respectively.

It had the appearance of a mixture of rubble of various dimensions. Its analysis by gas chromatography, after extraction with methylene chloride, gave the results shown in table 4.

It should be noted that the values shown in this table are lower than the minimum concentrations indicated by EPA.

The flows obtained from the centrifugation of the culture broth coming from the bio-reactor had characteristics which were basically similar to those of table 1.

TABLE 4

Results of the gas chromatographic analysis carried out on the treated material (values in mg/Kg).

| | |
|---|---|
| Anthracene | 0.21 |
| Benzene | ND |
| Benzo(a) anthracene | 0.8 |
| Benzo(a) pyrene | 0.4 |
| Bis(2ethyl) phalate | NA |
| Chrysene | NA |
| Di-n-butyl phalate | NA |
| Ethylbenzene | ND |
| Naphthalene | 3.0 |
| Phenanthrene | 2.2 |
| Phenol | ND |
| Pyrene | 1.3 |
| Toluene | ND |
| Xylenes | ND |
| Cyanides | NA |
| o-Cresol | ND |

ND = Not Detectable, NA = Not Analyzed

EXAMPLE 3

The performance of the experimental apparatus described in example 2 was examined under more favourable process conditions of the washing section both from an operational point of view and also with respect to the consumption of chemicals. For this purpose, the extraction of the oily phase was carried out with the supernatant liquid as such thus avoiding the correction of the pH with sodium carbonate and without heating. The three extractions were then carried out at pH 7 and at 35° C., the extraction ratio remaining unaltered. The procedure described in example 2 was repeated under these new conditions.

The results obtained showed that the total weight balance, as also the polluting matter of the streams resulting from the centrifugation of the culture broth, did not undergo significant variations. Instead a certain increase in the content of hydrocarbons in the final treated material was noted (1.7 against the 0.7% of example 2). This increase however was not sufficient to jeopardize the final disposal of the treated solid material. Its complete characterization in fact confirmed that it can be still placed in second category type-B burrows.

EXAMPLE 4

The process described in the previous example was again improved.

This improvement was achieved in the washing phase of the residue and biological oxidation. To exploit to the utmost the surface-active capacities of the culture broth, mainly present in the microbic mass, the washing was carried out using part of the flow leaving the biological reactor. In this way, the separation operation of the biomass by centrifugation was avoided. The recycling of the culture broth also causes an increase in the biomass available in the biological reactor, with a consequent increase in the surface-active and biodegradative capacities of the system.

The system thus modified, was handled under the same conditions as the previous example. It gave similar performances both in terms of material balance and characteristics of the stream to be placed in the burrow.

Under standard conditions, the aqueous flow to be disposed of in the water-treatment plant had a moderately higher polluting matter due to the presence of biomass and suspended solids.

This organic matter mainly consists of active microbic cells with a high degradation capacity of hydrocarbons, and is therefore undoubtedly useful for the good functioning of the water-treatment plants of the refineries.

We claim:

1. A process for treating solid waste or mud contaminated by oily hydrocarbon residues, which process consists of the following steps:

(a) extracting oily hydrocarbon residues from the solid waste or mud, at least once at 40°–110° C., using a non-volatile organic solvent, thereby forming an oily supernatant phase and a solid phase, the ratio of organic solvent to oily hydrocarbon residues being 0.1–3:1;

(b) contacting the oily supernatant phase with a mixture of microbes which oxidize hydrocarbons and microbes which produce high levels of biosurfactant, so as to form a bio-oxidized solution; and (c) washing the solid phase formed in step (a) with a bio-oxidized solution selected from the group consisting of (i) the solution formed in step (b) and (ii) a culture broth comprising the mixture of microbes used in step (b), the ratio of bio-oxidized solution to solid phase being 5–15:1.

2. The process of claim 1, wherein in step (a) the ratio of organic solvent to oily hydrocarbon residues is 1:1.

3. The process of claim 1, wherein in step (a) the extracting is performed three times.

4. The process of claim 1, wherein in step (a) the non-volatile organic solvent is diesel oil.

5. The process of claim 1, wherein step (c) is carried out continuously.

6. The process of claim 1, wherein in step (c) the bio-oxidized solution is a culture broth comprising the mixture of microbes used in step (b).

* * * * *